United States Patent [19]

Bronsky et al.

[11] Patent Number: 4,469,124
[45] Date of Patent: Sep. 4, 1984

[54] GAS SHUT-OFF VALVE

[75] Inventors: Robert J. Bronsky, New Baltimore; Dennis B. Clark, Flat Rock; Jeffrey A. McKeen, Detroit, all of Mich.

[73] Assignee: Michigan Consolidated Gas Company, Detroit, Mich.

[21] Appl. No.: 340,376

[22] Filed: Jan. 18, 1982

[51] Int. Cl.³ .............................................. F16K 17/04
[52] U.S. Cl. ..................................... 137/464; 251/46; 251/61.3
[58] Field of Search .......................... 251/46, 43, 61.3; 137/456, 461, 505.28, 464; 91/426

[56] References Cited

U.S. PATENT DOCUMENTS

| | | | |
|---|---|---|---|
| 1,615,776 | 1/1927 | Slater | 137/464 |
| 2,027,762 | 1/1936 | Becker | 137/152.5 |
| 2,418,743 | 4/1947 | Baker | 137/153 |
| 2,472,070 | 6/1949 | Garretson | 137/68 |
| 2,688,975 | 9/1954 | Born | 137/464 |
| 2,948,262 | 8/1960 | Gratzmuller | 91/426 |
| 3,007,480 | 11/1961 | Stalnecker | 137/456 |
| 3,023,996 | 3/1962 | Robertson | 251/46 |
| 3,511,269 | 5/1970 | Kaatz | 137/496 |
| 3,661,173 | 5/1972 | Bauer | 137/464 |
| 3,692,047 | 9/1972 | Camp | 137/505.28 |

FOREIGN PATENT DOCUMENTS 353681  7/1931  United Kingdom ................ 137/464

OTHER PUBLICATIONS

"Pete's Plug," Peterson Equipment Company Brochure Bulletin 152T for "Reliance Type PLVM," American Meter Division, Singer Company.

Primary Examiner—Martin P. Schwadron
Assistant Examiner—James R. Shay
Attorney, Agent, or Firm—Harness, Dickey & Pierce

[57] ABSTRACT

A shut-off valve includes a valve stem or actuating member operatively connected to a pressure-responsive apparatus. The pressure-responsive apparatus is acted upon by fluid in a pressure chamber such that the valve mechanism is held open to permit fluid flow therethrough. A spring or biasing means is provided that automatically closes the valve mechanism whenever the pressure chamber is evacuated or depressurized such that the pressure-responsive apparatus can no longer maintain the shut-off valve in an open position.

17 Claims, 3 Drawing Figures

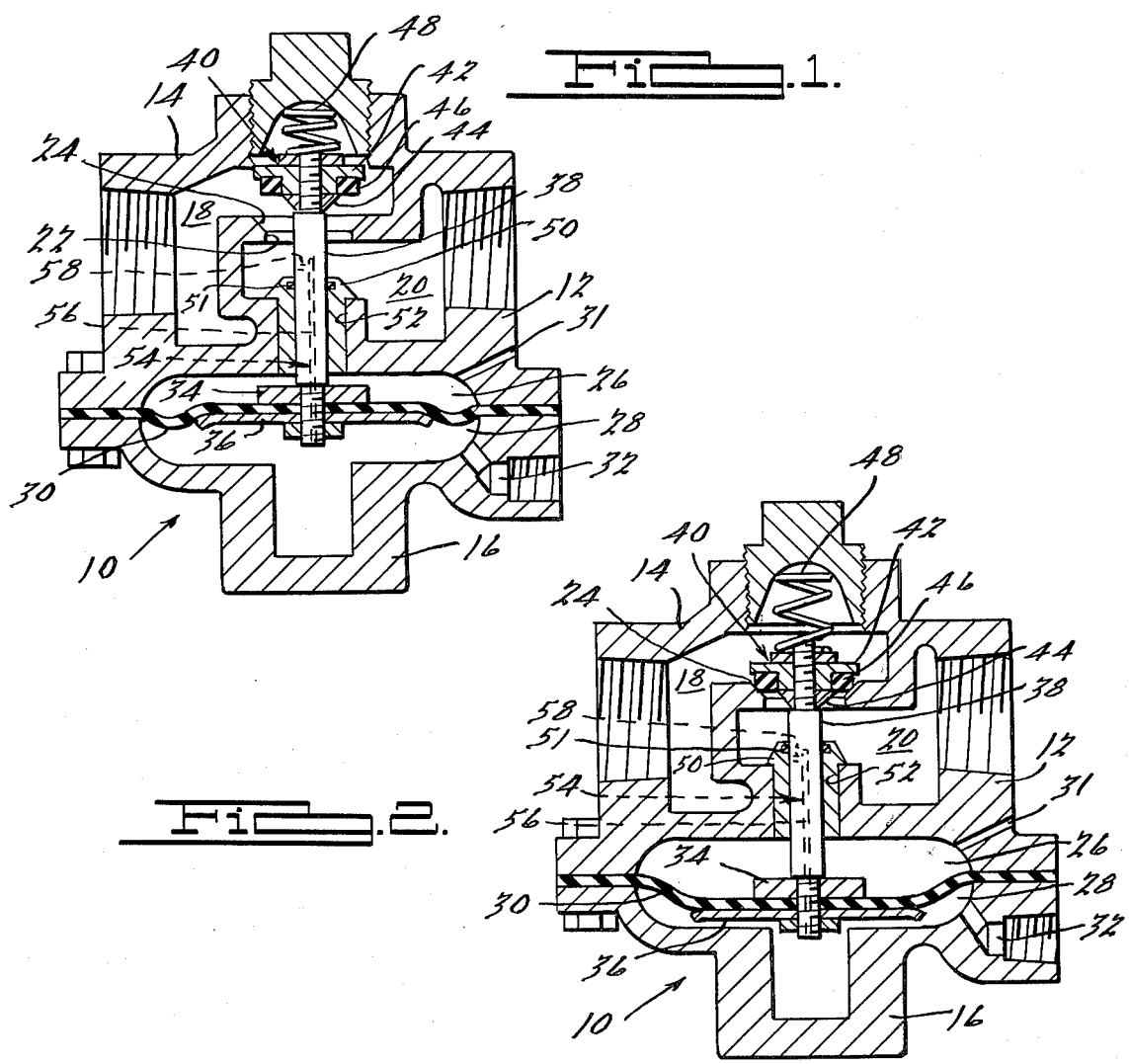
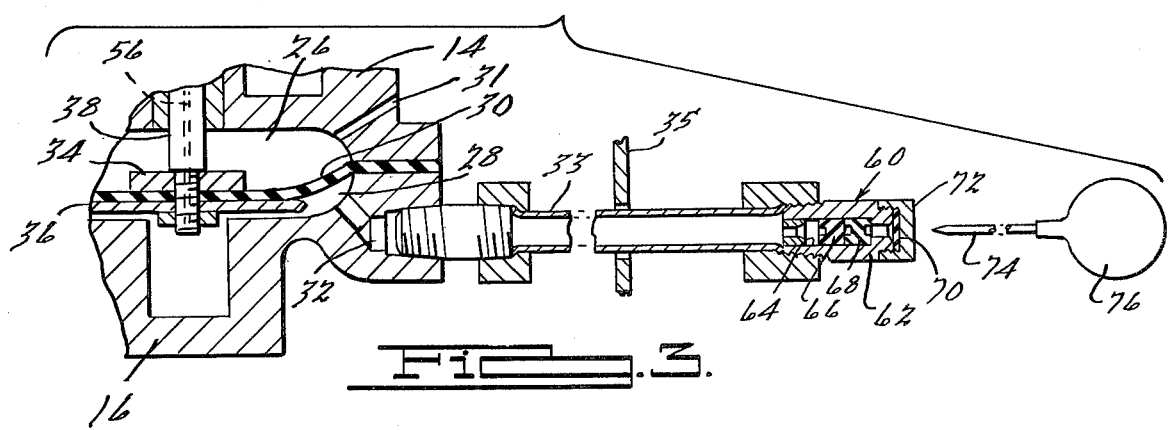

GAS SHUT-OFF VALVE

BACKGROUND OF THE INVENTION

The invention relates to an selectively actuable gas shut-off valve apparatus for fluid supply systems and more particularly to such shut-off valve apparatus for automatically shutting off the flow of fluid therethrough in response to evacuation of a previously pressurized valve-actuating chamber.

In fluid supply systems, such as those commonly used by a public utility for providing gaseous or liquid fuels, or other fluid commodities, to its customers, it is often desirable to terminate such fluid supply under various conditions. For example, if a customer has discontinued paying his utility bills for a substantial period of time, it is desirable to have a means, with which the customer cannot easily tamper, by which that customer's service may be conveniently and rapidly terminated without access to the structures on the premises being served. No such convenient or rapidly-actuable termination means has previously been available.

One of the objects of the invention, therefore, is to provide a simple, inexpensive, and relatively tamper-proof valve apparatus for conveniently and rapidly shutting off a fluid supply system where conditions dictate that the supply of such fluid be terminated. Another of the objects of the invention is to provide such a shut-off valve apparatus which may be operated remotely without having access to the interior of the structure being served by such supply system. Still another of the objects of the invention is to provide such a shut-off valve apparatus which may be conveniently re-opened, reset and reused when the fluid supply is re-established. These and other objects of the invention will become apparent from the following discussion and the drawings in connection therewith.

SUMMARY OF THE INVENTION

A shut-off valve includes a valve body with inlet and outlet chambers separated by a valve mechanism. The valve body also preferably includes a separate pressure chamber with a pressure-responsive apparatus operatively connected to a valve stem member adapted to actuate the valve mechanism. The valve stem member preferably includes a passageway therethrough for providing fluid communication between the outlet chamber and the pressure chamber when the valve mechanism is in an open position. The preferred shut-off valve also includes a sleeve-like member in which the valve stem member is slidably received and positioned such that such fluid communication is blocked by an O-ring or other sealing device when the valve mechanism is in a closed position. The valve mechanism is preferably biased toward its closed position such that when the pressure chamber is evacuated or depressurized so that the pressure-responsive apparatus can no longer hold the valve open, the valve mechanism is automatically urged into its closed position, thereby halting further fluid flow therethrough.

The preferred shut-off valve also includes an externally operable system for re-pressurizing the pressure chamber to urge the valve mechanism open from its closed position in order to re-establish flow therethrough.

BRIEF DESCRIPTION OF THE DRAWINGS

FIG. 1 is a longitudinal cross-sectional view of a preferred shut-off valve, shown in an open position, embodying the invention.

FIG. 2 is a longitudinal cross-sectional view of the shut-off valve of FIG. 1 shown in a closed position.

FIG. 3 is a longitudinal partial cross-sectional view of the shut-off valve of FIG. 1 shown with apparatus for evacuating or repressurizing the pressure chamber.

DETAILED DESCRIPTION OF THE PREFERRED EMBODIMENTS

FIGS. 1 and 2 illustrate a shut-off valve, indicated generally by reference numeral 10, embodying the invention. The shut-off valve 10 includes a valve body 12, preferably having an upper portion 14 and a lower portion 16. The valve body 12, which is adapted for fluid flow therethrough, also includes a fluid inlet chamber 18 and a fluid outlet chamber 20 separated by a flow orifice 22 which defines a valve seat 24. The shut-off valve 10 may be located in the supply line for a fluid supply system. In a gaseous fuel supply system, for example, the shut-off valve 10 may be located either upstream or downstream of the pressure regulator.

The upper and lower portions 14 and 16, respectively, each include cavities therein which form an upper diaphragm chamber 26 and a lower diaphragm chamber, referred to as a pressure chamber 28. The upper diaphragm chamber 26 and the pressure chamber 28 are preferably separated and sealingly isolated by a flexible pressure-responsive diaphragm member 30. Preferably, a vent 31 is provided in the upper diaphragm chamber 26, which communicates with the atmosphere. The vent 31 provides communication between the upper diaphragm chamber 26 and the atmosphere so that the diaphragm member 30 may move freely when acted upon by fluid in the pressure chamber as is explained in detail below. A communication passage 32 communicates the pressure chamber 28 with the exterior of the valve body 12. Preferably, a length of tubing 33 is connected to the communication passage 32 for pressurizing or evacuating the pressure chamber 28 is as described in detail below.

The diaphragm member 30 preferably includes a pair of reinforcing plates 34 and 36 secured thereto, with its outer edges restrained between the upper and lower portions, 14 and 16, respectively, of the valve body 12. In the preferred arrangement, the diaphragm member 30 and its reinforcing plates 34 and 36 are attached to one end of a valve stem or actuation member 38, which extends through the upper diaphragm chamber 26 and the outlet chamber 20 and has a valve assembly 40 at its opposite end. The valve assembly 40 preferably includes a seat disc holder 42 and a retainer disc 44, with a seat disc 46 therebetween. The seat disc 46 may be composed of any of a number of compliant materials known in that art that are capable of seating in a leak-proof relationship with the valve seat 24 around the periphery of the flow orifice 22. The valve assembly 40 is biased toward a closed position, wherein the seat disc 46 is disposed in sealing engagement with the valve seat 24, by a spring or biasing member 48 which is preferably a compressed coil spring. Although the valve assembly 40 and the flow orifice 22 are shown in FIGS. 1 and 2 for purposes of illustration, those skilled in the art will readily recognize that other valve closure structures and arrangements capable of shutting off fluid flow through the shut-off valve 10 may also be employed.

The valve stem or actuation member 38 is slidably received in a sleeve member 50 which is secured in an aperture 52 in the valve body 12 between the outlet chamber 20 and the upper diaphragm chamber 26. An O-ring or sealing member 51 is disposed between the sleeve member 50 and the valve stem or actuating member 38 and sealing prevents communication between the outlet chamber 20 and the inside of the sleeve member 50. The valve stem or actuation member 38 includes an opening or fluid passageway 54 extending through a portion thereof to provide fluid communication between the outlet chamber 20 and the pressure chamber 28 when the valve assembly 40 is in its open position as shown in FIG. 1. Although other configurations for providing such fluid communication will occur to those skilled in the art, the preferred fluid passageway 54 comprises a first bore 56 extending in an axial or longitudinal direction through a portion of the valve stem or actuation member 38 and a second bore 58 extending radially into the valve stem or actuation member 38 to intersect with the first bore 56. The second bore 58 is located at an axial position on the valve stem or actuation member 38 such that it is exposed to the outlet chamber 20 to provide communication with the pressure chamber 28 when the valve assembly 40 is in its open position, as shown in FIG. 1. When the valve assemby 40 is in its closed position as shown in FIG. 2, however, the second bore 58 is blocked off by the sleeve member 50 and the O-ring or sealing member 51, thereby preventing fluid communication between the outlet chamber 20 and the pressure chamber 28.

FIG. 3 illustrates a length of tubing 33 connected via any suitable fluid fitting means to the communication passage 32, with a closure plug 60 threadably secured to the outer end of the tubing 33. Such tubing may be of a suitable length to facilitate remote shut-off from the exterior side of a wall 35, for example. The closure plug 60 may comprise any of a number of known suitable valve or closure mechanisms such as a device known as "Pete's Plug", manufactured and sold by Peterson Equipment Company, Inc., which is shown only for purposes of illustration in FIG. 3. The illustrated closure plug 60 includes a plug body 62 with a stepped bore 64 therethrough and a pair of elastomeric self-closing valve members 66 and 68 received therein. A sealing gasket 70 is compressed between a cap 72 which is threaded onto the open end of the plug body 62. The cap 72 and the sealing gasket 70 may be removed, and the self-closing valve members 66 and 68 are adapted to be pierced by a needle-type fitting 74 on an aspirator or pressure source 76 for pressurizing the pressure chamber 28 as will be explained in detail in the discussion below relating to the operation of the shut-off valve 10. The closure plug 60 is preferably attached to the tubing 33, as shown in FIG. 3, or alternatively may be attached directly to the communication passage 32. The aspirator or pressure source 76 preferably comprises any of a number of convenient, portable pressure-producing devices known in the art and is equipped with a fitting such as needle-type fitting 74 illustrated in FIG. 3.

The operation of the shut-off valve 10 may be described as follows. In order to establish flow through the shu-off valve 10, in the preferred embodiment, the cap 70 is removed from the closure plug 60, and the needle-type fitting 74 of the pressure source 76 is inserted therethrough. Air or another suitable fluid is pumped or forced through the tubing 33 to pressurize the pressure chamber 28. The diaphragm member 30 is forced by said pressurized fluid to deflect from the position shown in FIG. 2 to the position shown in FIG. 1, thereby urging the valve assembly 40 to its open position and establishing flow through the shut-off valve 10. Once the second bore 58 clears the sleeve member 50, the pressure chamber 28 is exposed to the fluid pressure in the outlet chamber 20. As the pressure in the outlet chamber 20 builds, the pressure in the pressure chamber 28 correspondingly builds to a level sufficient to maintain the diaphragm member 30 in such deflected position. The fluid pressure in the pressure chamber 28 thus maintains the valve stem or actuation member 38, and thus the shut-off valve 10, in their open-valve positions, as shown in FIG. 1. The pressure source 76 is then removed and the self-closing valve members 66 and 68 reseal to allow the sealing gasket 70 and the cap 72 to be replaced on the closure member 60 without sufficient loss of pressure in the pressure chamber 28 to cause the shut-off valve assembly 10 to close.

Whenever it is necessary or desirable to shut off the flow of a fluid, such as natural gas or other fuels, through the shut-off valve 10, the tubing 33 is merely opened to the atmosphere, thereby evacuating or depressurizing the pressure chamber 28. Once the pressure chamber 28 is evacuated the pressure therein is no longer sufficient to hold the diaphragm member 30 in its deflected position against the biasing force of the spring or biasing member 48, as shown in FIG. 1. Thus, the seat disc holder 42 and the seat disc 46 are urged from their respective open positions shown in FIG. 1 toward their respective closed positions with the seat disc 46 sealingly engaging the valve seat 24 as shown in FIG. 2, thereby blocking the flow between the inlet and outlet chambers 18 and 20 and thus terminating the flow through the shut-off valve 10. Because of the position and orientation of the seat disc holder 42 and the seat disc 46 relative to the valve seat 24, the upstream fluid pressure in the inlet chamber 18 tends to aid the spring or biasing member 48 in holding the shut-off valve 10 tightly closed.

Since the tubing 33 is preferably composed of plastic, rubber or other easily severable materials, the shut-off valve 10 may be very quickly and easily closed merely by severing the tubing 33 with any of a number of common cutting tools. Furthermore, the tubing 33 and the communication passage 32 are sized to be sufficiently large to cause the pressure in the pressure chamber 28 to drop rapidly when the tubing 33 is opened quickly, thereby causing the shut-off valve 10 to close very quickly. It is especially important that the tubing 33 and the communication passage 32 are sufficiently larger than the fluid passageway 54 such that the flow through the tubing 33 and the communication passage 32 is greater than that through the fluid passageway 54, thereby allowing the pressure chamber to evacuate and the shut-off valve 10 to close rapidly.

The above-described preferred shut-off valve 10 is relatively tamper-proof by a customer or others inside a structure being supplied. Unlike electrical shut-off actuating devices which can be defected by the customer merely by cutting the feed wires to the device, the shut-off valve 10 automatically closes if the customer severs the tubing 33. If the customer cuts the tubing 33 in an attempt to stop the utility company from shutting off his fuel supply, he will cause the pressure chamber 28 to be evacuated and the shut-off valve 10 to close.

Additionally, the sealing engagement of the O-ring or sealing member 51 with the valve stem 38, at a position isolating the fluid passageway 54 from the outlet chamber 20, aids in preventing a closed shut-off valve 10 from being improperly reopened by the customer. Such sealing engagement prevents the customer from pressurizing the pressure chamber by way of the outlet chamber 20 by applying a back pressure on the shut-off valve 10 from a fuel nozzle in one of his appliances.

The drawings and the above description relate to merely exemplary embodiments of the invention. Changes, variations and modifications may be made therein without departing from the spirit and scope of the invention as defined in the following claims.

What is claimed is:

1. In a valve having a valve body with inlet and outlet chambers therein, valve means separating said inlet and outlet chambers, a pressure chamber in said valve body having fluid pressure-responsive means therein, a valve actuation member having a first end operatively connected to said fluid pressure-responsive means and a second end operatively connected to said valve means, said fluid pressure-responsive means and said valve actuation member being moveable to urge said valve means into an open position in response to fluid pressure above atmospheric pressure in said pressure chamber, the improvement comprising biasing means for biasing said valve means into a closed position, and fluid passage means for providing fluid communication between said outlet chamber and said pressure chamber when said valve means is in said open position and for preventing said fluid communication when said valve means is in said closed position, whereby said valve means is held in its open position when the pressure in said pressure chamber is above said atmospheric pressure, said valve means being biased into its closed position whenever said pressure in said pressure chamber drops below said atmospheric pressure, said fluid passage means including an opening extending through a portion of said valve actuation member, said valve actuation member being slidably received in a sleeve member and positioned such that one end of said fluid passageway is blocked by said sleeve member when said valve means is in its closed position, and sealing means for isolating said opening from said outlet chamber when said valve means is in its closed position.

2. The improvement according to claim 1, wherein said opening in said valve actuation member comprises a first bore extending axially through a first portion of said valve actuation member and a second bore extending radially through a second portion of said valve actuation member, said first bore being in communication with said second bore and said pressure chamber, said second bore being in communication with said outlet chamber when said valve means is in its open position and being isolated from said outlet chamber by said sleeve member and said sealing means when said valve means is in its closed position.

3. The improvement according to claim 2, further comprising communication means for introducing fluid into said pressure chamber, when said valve means is in its closed position in order to urge said valve means into its open position, thereby initiating fluid flow through said valve, said communication means including closure means for closing said communication means once said valve means is in its open position, said closure means being selectively removeable when said valve means is open in order to evacuate said pressure chamber to the atmosphere, thereby closing said valve means and stopping said fluid flow through said valve.

4. The improvement according to claim 3, wherein the flow through said communication means is greater than the flow through said fluid passage means, when said pressure chamber is being evacuated to the atmosphere.

5. The improvement according to claim 4, wherein said communication means comprises a threaded aperture through said valve body in communication with said pressure chamber, said closure means comprising a threaded plug member adapted for sealing engagement with said threaded aperture, said plug means being adapted for receiving an external source of fluid for pressurizing said pressure chamber in order to open said valve means.

6. The improvement according to claim 4, wherein said communication means comprises an aperture through said valve body in communication with said pressure chamber, tubing means for connecting said aperture to said closure means at opposite ends of said tubing means, said closure means being adapted for receiving an external source of fluid for pressurizing said pressure chamber in order to open said valve means.

7. In a valve apparatus having a valve body with inlet and outlet chambers therein for fluid flow therethrough, a flow orifice between said inlet and outlet chambers, a valve assembly biased in a direction so as to sealingly close said flow orifice, a valve assembly actuation member slidably received in a sleeve member for urging said valve assembly into an open position, the improvement comprising a pressure chamber having a pressure-responsive diaphragm therein, said diaphragm being connected to said actuation member such that fluid pressure above atmospheric pressure in said pressure chamber acts on said diaphragm to urge said valve assembly into said open position, said actuation member having a fluid passageway therethrough, said fluid passageway comprising a first bore extending axially through a first portion of said actuation member and communicating with said pressure chamber and a second bore extending radially through a second portion of said actuation member to intersect with said first bore, said second bore being positioned in said actuation member so as to be in communication with said outlet chamber when said valve assembly is in its open position and being blocked by said sleeve member when said valve assembly is in its closed position, and sealing means for isolating said outlet chamber from said second bore when said valve assembly is in said closed position, whereby said valve assembly automatically closes said flow orifice when the fluid pressure in said pressure chamber is evacuated to the atmosphere.

8. The improvement according to claim 7, further comprising a passageway through said valve body communicating with said pressure chamber, a length of tubing having one end thereof connected to said passageway, and means connected to a second opposite end of said tubing for selectively communicating said passageway with the atmosphere and for externally admitting a pressurized fluid into said passageway through said tubing, whereby said valve assembly may be selectively opened or closed from a remote location.

9. The improvement according to claim 8, wherein said selective communicating means includes a selectively operable closure mechanism, said improvement further comprising portable pressurizing means for selectively admitting said pressurized fluid into said pressure chamber through said closure mechanism and said tubing, thereby allowing said valve assembly to be urged into its open position.

10. In a valve having a valve body with inlet and outlet chambers therein, valve means separating said inlet and outlet chambers, a pressure chamber in said valve body having fluid pressure-responsive means therein, a valve actuation member having a first end operatively connected to said fluid pressure-responsive means and a second end operatively connected to said valve means, said fluid pressure-responsive means and said valve actuation member being moveable to urge said valve means into an open position in response to fluid pressure above atmospheric pressure in said pressure chamber, the improvement comprising biasing means for biasing said valve means into a closed position, and fluid passage means through at least a portion of said valve actuation member for providing fluid communication between said outlet chamber and said pressure chamber when said valve means is in said open position and for preventing said fluid communication when said valve means is in said closed position, whereby said valve means is held in its open position when the pressure in said pressure chamber is above said atmospheric pressure, said valve means being biased into its closed position whenever said pressure in said pressure chamber drops below said atmospheric pressure, said fluid passage means including an opening extending through a portion of said valve actuation member, said valve actuation member being slidably received in a sleeve member and positioned such that one end of said fluid passageway is blocked by said sleeve member when said valve means is in its closed position, and sealing means for isolating said opening from said outlet chamber when said valve means is in its closed position, said opening in said valve actuation member including a first bore extending axially through a first portion of said valve actuation member and a second bore extending radially through a second portion of said valve actuation member, said first bore being in communication with said second bore and said pressure chamber, said second bore being in communication with said outlet chamber when said valve means is in its open position and being isolated from said chamber by said sleeve member and said for sealing means when said valve means is in its closed position.

11. The improvement according to claim 10, further comprising communication means for introducing fluid into said pressure chamber, when said valve means is in its closed position in order to urge said valve means into its open position, thereby initiating fluid flow through said valve, said communication means including closure means for closing said communication means once said valve means is in its open position, said closure means being selectively removeable when said valve means is open in order to evacuate said pressure chamber to the atmosphere, thereby closing said valve means and stopping said fluid flow through said valve.

12. The improvement according to claim 11, wherein the flow through said communication means is greater than the flow through said fluid passage means, when said pressure chamber is being evacuated to the atmosphere.

13. The improvement according to claim 12, wherein said communication means comprises a threaded aperture through said valve body in communication with said pressure chamber, said closure means comprising a threaded plug member adapted for sealing engagement with said threaded aperture, said plug means being adapted for receiving an external source of fluid for pressurizing said pressure chamber in order to open said valve means.

14. The improvement according to claim 12, wherein said communication means comprises an aperture through said valve body in communication with said pressure chamber, tubing means for connecting said aperture to said closure means at opposite ends of said tubing means, said closure means being adapted for receiving an external source of fluid for pressurizing said pressure chamber in order to open said valve means.

15. In a valve apparatus having a valve body with inlet and outlet chambers therein for fluid flow therethrough, a flow orifice between said inlet and outlet chambers, a valve assembly biased in a direction so as to sealingly close said flow orifice, said valve assembly actuation member slidably received in a sleeve member for urging said valve assembly into an open position, the improvement comprising a pressure chamber having a pressure-responsive diaphragm therein, said diaphragm being connected to said actuation member such that fluid pressure above atmospheric pressure in said pressure chamber acts on said diaphragm to urge said valve assembly into said open position, said actuation member having fluid passage means therethrough for providing fluid communication between said pressure chamber and said outlet chamber when said valve assembly is in its open position, said fluid passage means being blocked by said sleeve member when said valve assembly is in its closed position, and sealing means for isolating said outlet chamber from said second bore when said valve assembly is in said closed position, whereby said valve assembly automatically closes said flow orifice when the fluid pressure in said pressure chamber is evacuated to the atmosphere.

16. The improvement according to claim 15, further comprising a passageway through said valve body communicating with said pressure chamber, a length of tubing having one end thereof connected to said passageway, and means connected to a second opposite end of said tubing for selectively communicating said passageway with the atmosphere and for externally admitting a pressurized fluid into said passageway through said tubing, whereby said valve assembly may be selectively opened or closed from a remote location.

17. The improvement according to claim 16, wherein said selective communicating means includes a selectively operable closure mechanism, said improvement further comprising portable pressurizing means for selectively admitting said pressurized fluid into said pressure chamber through said closure mechanism and said tubing, thereby allowing said valve assemby to be urged into its open position.

* * * * *

UNITED STATES PATENT AND TRADEMARK OFFICE
CERTIFICATE OF CORRECTION

PATENT NO. : 4,469,124

DATED : September 4, 1984

INVENTOR(S) : Robert J. Bronsky, Dennis B. Clark and Jeffrey A. McKeen

It is certified that error appears in the above-identified patent and that said Letters Patent is hereby corrected as shown below:

Column 1, line 5    "an" should be -- a --

Column 3, line 65   "shu-off" should be
                    -- shut-off --

Column 7, line 47
                    after "said" (second occurrence)
                    delete "for"

Column 8, line 25
                    "said" (second occurrence)
                    should be -- a --

Signed and Sealed this

Twentieth Day of August 1985

[SEAL]

Attest:

DONALD J. QUIGG

*Attesting Officer*    *Acting Commissioner of Patents and Trademarks*